US010132198B2

(12) United States Patent
Baba et al.

(10) Patent No.: US 10,132,198 B2
(45) Date of Patent: Nov. 20, 2018

(54) SUPPORT APPARATUS FOR DISASSEMBLING AND ASSEMBLING GAS TURBINE ENGINE

(71) Applicant: HONDA MOTOR CO., LTD., Tokyo (JP)

(72) Inventors: Atsushi Baba, Wako (JP); Tsuyoshi Sato, Wako (JP); Shinichi Obara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 423 days.

(21) Appl. No.: 14/988,943

(22) Filed: Jan. 6, 2016

(65) Prior Publication Data

US 2017/0191381 A1 Jul. 6, 2017

(51) Int. Cl.
*F16M 7/00* (2006.01)
*F01D 25/28* (2006.01)

(52) U.S. Cl.
CPC ........... *F01D 25/285* (2013.01); *F01D 25/28* (2013.01); *F05D 2230/68* (2013.01); *F05D 2230/70* (2013.01)

(58) Field of Classification Search
CPC ........ F16M 7/00; F16M 5/00; F16M 2200/08; F16M 1/00
USPC ......................................... 248/544, 637, 640
See application file for complete search history.

(56) References Cited

U.S. PATENT DOCUMENTS 8,245,511 B2 * 8/2012 Cowland ................ F01M 11/02 60/605.3
8,932,093 B2 * 1/2015 Hagi ...................... B63H 20/02 440/52
9,506,597 B2 * 11/2016 Arner ........................ F16M 5/00
9,593,799 B2 * 3/2017 Wang ........................ F16F 15/04
9,616,986 B1 * 4/2017 Gilk ...................... B63H 20/106
2009/0095875 A1 * 4/2009 Anello .................. F02B 37/004 248/637
2009/0258551 A1 * 10/2009 Nomura ................. B63H 20/02 440/76
2012/0006966 A1 * 1/2012 Mynster ................. B63H 20/08 248/642
2015/0140877 A1 * 5/2015 Shields .................. B63H 20/12 440/6

FOREIGN PATENT DOCUMENTS

WO 2004/097182 11/2004

* cited by examiner

*Primary Examiner* — Steven M Marsh

(74) *Attorney, Agent, or Firm* — Rankin, Hill & Clark LLP

(57) ABSTRACT

A support apparatus for disassembling and assembling a gas turbine engine includes an exhaust nozzle attaching and detaching device for guiding movement of an exhaust nozzle in an axis direction and including: a first guide jig detachably fixed to a casing; and a first holding tool detachably supporting the nozzle and engaged with the first guide jig, thereby enabling attaching and detaching the nozzle easily and securely while leaving the engine in a horizontal attitude. The apparatus also includes a low-pressure turbine attaching and detaching device guiding movement of a low-pressure turbine in the axis direction and including: a second guide jig detachably fixed to the casing; and a second holding tool detachably supporting the turbine and engaged with the second guide jig, thereby enabling attaching and detaching the turbine easily and securely while leaving the engine in the horizontal attitude.

7 Claims, 17 Drawing Sheets

SUPPORT APPARATUS FOR DISASSEMBLING AND ASSEMBLING GAS TURBINE ENGINE

BACKGROUND OF THE INVENTION

Field of the Invention

The present invention relates to a support apparatus for disassembling and assembling a gas turbine engine housing a low-pressure shaft, a low-pressure turbine and an exhaust nozzle inside a cylindrical casing surrounding an axis of the gas turbine engine, the low-pressure shaft being disposed on the axis, the low-pressure turbine being fixed to an outer periphery of the low-pressure shaft, and the exhaust nozzle being disposed in a rear of the low-pressure turbine.

Description of the Related Art

Published Japanese Translation No. 2006-524769 of PCT/DE2004/000655 has made publicly known a method in which: a gas turbine engine is carried into a first facility and cleaned in a horizontal attitude there; and after cleaned, the gas turbine engine is carried into a second facility and disassembled in the horizontal attitude there.

Meanwhile, a high-pressure turbine, a low-pressure turbine and an exhaust nozzle, through which a combustion gas produced by a combustor in a gas turbine engine passes, are disposed inside a cylindrical casing in this order from a front to a rear. The high-pressure turbine to be exposed to the combustion gas whose temperature is highest immediately after produced by the combustor needs to be inspected and replaced in a relatively short time. Detachment of the high-pressure turbine requires that the low-pressure turbine and the exhaust nozzle disposed in a rear of the high-pressure turbine be detached in advance.

In a case where the low-pressure turbine and the exhaust nozzle are detached while leaving the gas turbine engine in the horizontal attitude, gravity acts on the low-pressure turbine and the exhaust nozzle in a radial direction of the gas turbine engine so that it is difficult to pull out these components straightly in an axial direction of the gas turbine engine and therefore workability of disassembling work is lowered. Further, the components may be damaged due to their tilt or their interference with other components. Published Japanese Translation No. 2006-524769 of PCT/DE2004/000655 given above does not disclose concrete means for disassembling the gas turbine engine in the horizontal attitude.

When disassembling and assembling of the gas turbine engine were performed in a vertical attitude, the gravity acting on the low-pressure turbine and the exhaust nozzle is directed in the axial direction of the gas turbine engine. Accordingly, it is easy to attach and detach the components straightly in the axial direction of the gas turbine engine, and the workability is improved. However, when the aircraft gas turbine engine is disassembled and assembled while being installed in an airframe in order to reduce maintenance time and maintenance cost, it is impossible to employ the method in which the disassembling and assembling are performed in the gas turbine engine in the vertical attitude.

SUMMARY OF THE INVENTION

The present invention has been made with the foregoing situations taken into consideration. An object of the present invention is to attach and detach a low-pressure turbine and an exhaust nozzle easily and securely without damaging them while leaving a gas turbine engine in a horizontal attitude.

In order to achieve the object, according to a first feature of the present invention, there is provided a support apparatus for disassembling and assembling a gas turbine engine housing a low-pressure shaft, a low-pressure turbine and an exhaust nozzle inside a cylindrical casing surrounding an axis of the gas turbine engine, the low-pressure shaft being disposed on the axis, the low-pressure turbine being fixed to an outer periphery of the low-pressure shaft, and the exhaust nozzle being disposed in a rear of the low-pressure turbine, the support apparatus comprising: an exhaust nozzle attaching and detaching device configured to guide movement of the exhaust nozzle in a direction of the axis and including a first guide jig which is detachably fixed to the casing, and a first holding tool which detachably supports the exhaust nozzle and is engaged with the first guide jig; and a low-pressure turbine attaching and detaching device configured to guide movement of the low-pressure turbine in the direction of the axis and including a second guide jig which is detachably fixed to the casing, and a second holding tool which detachably supports the low-pressure turbine and is engaged with the second guide jig.

According to the first feature, the support apparatus for disassembling and assembling a gas turbine engine includes the exhaust nozzle attaching and detaching device configured to guide the movement of the exhaust nozzle in the direction of the axis and including: the first guide jig which is detachably fixed to the casing; and the first holding tool which detachably supports the exhaust nozzle and is engaged with the first guide jig. Therefore, the exhaust nozzle can be attached and detached easily and securely without damaging the exhaust nozzle while leaving the gas turbine engine in the horizontal attitude. Accordingly, maintenance cost can be reduced. In addition, the support apparatus for disassembling and assembling a gas turbine engine includes the low-pressure turbine attaching and detaching device configured to guide the movement of the low-pressure turbine in the direction of the axis and including: the second guide jig which is detachably fixed to the casing; and the second holding tool which detachably supports the low-pressure turbine and is engaged with the second guide jig. Therefore, the low-pressure turbine can be attached and detached easily and securely without damaging the low-pressure turbine while leaving the gas turbine engine in the horizontal attitude. Accordingly, maintenance cost can be reduced.

According to a second feature of the present invention, in addition to the first feature, the first guide jig and the second guide jig are fixed with a machined surface of the casing used as a reference surface.

According to the second feature, the first guide jig and the second guide jig are fixed with the machined surface of the casing used as the reference surface. For this reason, the first guide jig and the second guide jig are positioned with high precision, and the exhaust nozzle and the low-pressure turbine can be attached and detached smoothly by being guided correctly in the direction of the axis. Further, positioning of the first guide jig and the second guide jig no longer requires a specialized jig, thereby reducing cost.

According to a third feature of the present invention, in addition to the first or second feature, the second holding tool includes an arc-shaped engagement portion which is engaged with blade ends of a plurality of rotor blades of the low-pressure turbine, the rotor blades being provided adjacent to one another in a peripheral direction of the low-pressure turbine.

According to the third feature, the second holding tool includes the arc-shaped engagement portion which is engaged with the blade ends of the multiple rotor blades of the low-pressure turbine, the rotor blades being provided adjacent to one another in the peripheral direction of the low-pressure turbine. For this reason, the low-pressure turbine can be held by the second holding tool in a stable attitude.

According to a fourth feature of the present invention, in addition to any one of the first to third features, there is provided the support apparatus for disassembling and assembling a gas turbine engine, further comprising a protection tool which is detachably attached to the low-pressure turbine so as to cover a part of the low-pressure turbine which is to be exposed in a state where the exhaust nozzle is detached.

According to the fourth feature, the support apparatus for disassembling and assembling a gas turbine engine further includes the protection tool which is detachably attached to the low-pressure turbine so as to cover the part of the low-pressure turbine which is to be exposed in the state where the exhaust nozzle is detached. For this reason, when the exhaust nozzle is attached to and detached from the low-pressure turbine, covering of the part of the low-pressure turbine with the protection tool makes it possible to prevent the part thereof from being damaged.

Note that an outer casing 11 of an embodiment corresponds to the casing of the present invention, and a protection cap 98 of the embodiment corresponds to the protection tool of the present invention.

The above and other objects, characteristics and advantages of the present invention will be clear from detailed descriptions of the preferred embodiment which will be provided below while referring to the attached drawings.

BRIEF DESCRIPTION OF THE DRAWINGS

FIG. 1 is a skeletal diagram showing an overall structure of a twin-spool turbofan engine;

FIG. 2 is a detailed view of a section 2 in FIG. 1;

FIG. 3 is an exploded view corresponding to FIG. 2;

FIG. 4 is a perspective view showing a used state of an exhaust nozzle attaching and detaching device and an attachment and detachment auxiliary jig;

FIG. 5 is a side view of the exhaust nozzle attaching and detaching device;

FIG. 6 is a view taken in a direction of an arrow 6 in FIG. 5;

FIG. 7 is a sectional view taken along a 7-7 line in FIG. 6;

FIG. 8 is a rear view of the attachment and detachment auxiliary jig;

FIG. 9 is a sectional view taken along a 9-9 line in FIG. 8;

FIG. 10 is an operation explanatory view when an exhaust nozzle is detached (Part 1);

FIG. 11 is an operation explanatory view when the exhaust nozzle is detached (Part 2);

FIG. 12 is a perspective view showing a used state of a low-pressure turbine attaching and detaching device;

FIG. 13 is a rear view of the low-pressure turbine attaching and detaching device;

FIG. 14 is a view taken in a direction of an arrow 14 in FIG. 13;

FIG. 15 is an operation explanatory view when a low-pressure turbine is detached (Part 1);

FIG. 16 is an operation explanatory view when the low-pressure turbine is detached (Part 2); and FIG. 17 is an operation explanatory view when the low-pressure turbine is detached (Part 3).

DESCRIPTION OF THE PREFERRED EMBODIMENT

An embodiment of the present invention will be hereinbelow described based on FIGS. 1 to 17.

Figure 1:
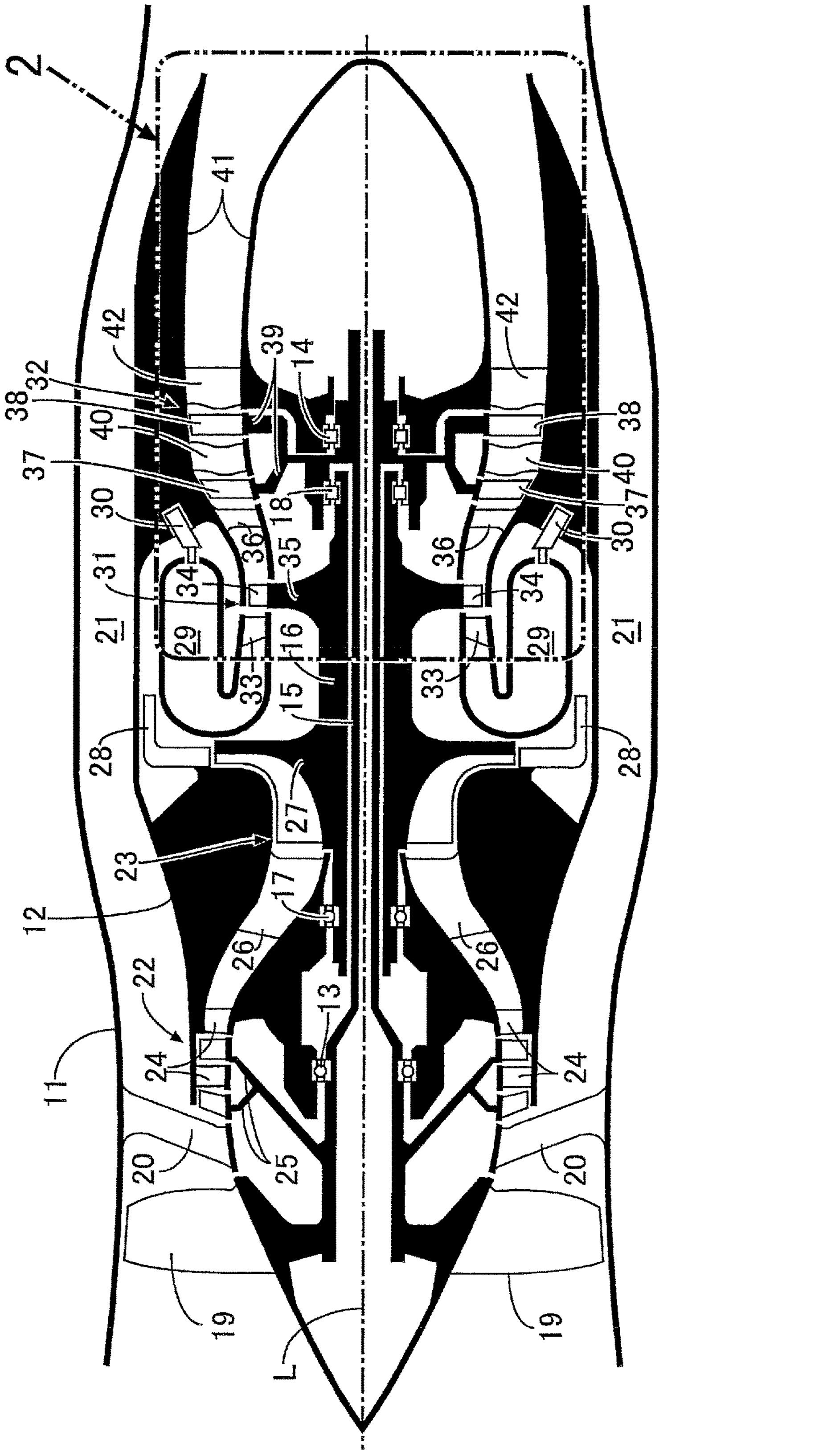
FIGS. 1 to 17 show an embodiment of the present invention.
Figure 2:
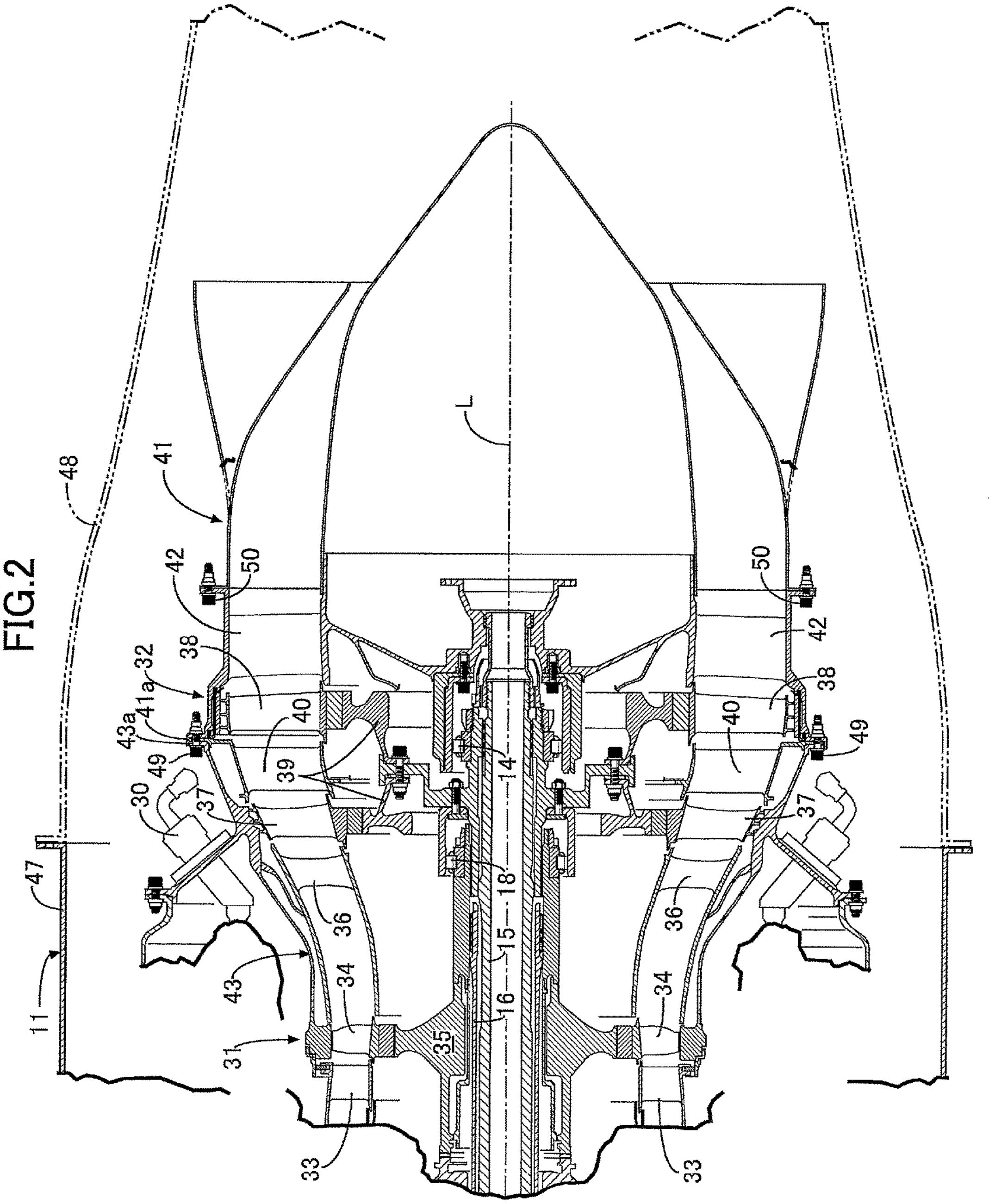

As shown in FIGS. 1 and 2, an aircraft twin-spool turbofan engine to which the present invention is applied includes an outer casing 11 and an inner casing 12. A front portion and a rear portion of a low-pressure shaft 15 are rotatably supported inside the inner casing 12 via a front first bearing 13 and a rear first bearing 14, respectively. A tubular high-pressure shaft 16 is relatively rotatably fitted to an outer periphery of an intermediate portion in an axial direction of the low-pressure shaft 15. A front portion of the high-pressure shaft 16 is rotatably supported in the inner casing 12 via a front second bearing 17, and a rear portion of the high-pressure shaft 16 is relatively rotatably supported on the low-pressure shaft 15 via a rear second bearing 18.

A front fan 19 whose blade tips face an inner surface of the outer casing 11 is fixed to a front end of the low-pressure shaft 15. Part of air sucked in by the front fan 19 passes through stator vanes 20 disposed between the outer casing 11 and the inner casing 12. Thereafter, part of the air having passed through the stator vanes 20 passes through an annular bypass duct 21 formed between the outer casing 11 and the inner casing 12, and is jetted rearward. The other part of the air is supplied to an axial-flow low-pressure compressor 22 and a centrifugal high-pressure compressor 23 which are disposed inside the inner casing 12.

The low-pressure compressor 22 includes: stator vanes 24 fixed inside the inner casing 12; and low-pressure compressor wheels 25 whose outer peripheries have compressor blades, and which are fixed to the low-pressure shaft 15. The high-pressure compressor 23 includes: stator vanes 26 fixed inside the inner casing 12; and a high-pressure compressor wheel 27 whose outer periphery has compressor blades, and which is fixed to the high-pressure shaft 16.

A reverse-flow combustion chamber 29 is disposed in a rear of a diffuser 28 connected to the outer periphery of the high-pressure compressor wheel 27. Fuel is injected from a fuel injection nozzle 30 into an inside of the reverse-flow combustion chamber 29. Inside the reverse-flow combustion chamber 29, the fuel and the air are mixed together, and the fuel-air mixture is burned to produce a combustion gas. The thus-produced combustion gas is supplied to a high-pressure turbine 31 and a low-pressure turbine 32.

The high-pressure turbine 31 includes: nozzle guide vanes 33 fixed to a rear end of a turbine duct 43; and a high-pressure turbine wheel 35 whose outer periphery has turbine blades 34, and which is fixed to the high-pressure shaft 16. The low-pressure turbine 32 includes: nozzle guide vanes 36 fixed inside the inner casing 12; low-pressure turbine wheels 39 whose outer peripheries have front-stage turbine blades 37 and rear-stage turbine blades 38, and which are fixed to the low-pressure shaft 15; stator vanes 40 fixed inside the inner casing 12, and disposed between the front-stage turbine blades 37 and the rear-stage turbine blades 38; and stator vanes 42 fixed to a front end of an exhaust nozzle 41.

Accordingly, when a starter motor not illustrated drives the high-pressure shaft 16, air sucked in by the high-pressure compressor wheel 27 is supplied to the reverse-flow combustion chamber 29, where the air is mixed with the fuel.

The fuel-air mixture is burned to produce a combustion gas. The thus-produced combustion gas drives the high-pressure turbine wheel 35 and the low-pressure turbine wheels 39. As a result, the low-pressure shaft 15 and the high-pressure shaft 16 rotate, the front fan 19, the low-pressure compressor wheels 25 and the high-pressure compressor wheel 27 compress the air, and supply the thus-compressed air to the reverse-flow combustion chamber 29. Thereby, the turbofan engine continues its operation even after the starter motor is stopped.

While the turbofan engine is in operation, part of the air sucked in by the front fan 19 passes through the bypass duct 21, and is jetted rearward, producing main thrust particularly during low-speed flight. Meanwhile, the rest of the air sucked in by the front fan 19 is supplied to the reverse-flow combustion chamber 29 so as to be mixed with the fuel. The fuel-air mixture burns and produces thrust by being jetted rearward after driving the low-pressure shaft 15 and the high-pressure shaft 16.

The present invention relates to the disassembling and assembling of main components in a hot section of a rear half of a gas turbine engine, through which a high-temperature combustion gas produced by the reverse-flow combustion chamber 29 passes, that is, the disassembling and assembling of the high-pressure turbine 31, the turbine duct 43, the low-pressure turbine 32 and the exhaust nozzle 41.

Figure 3:
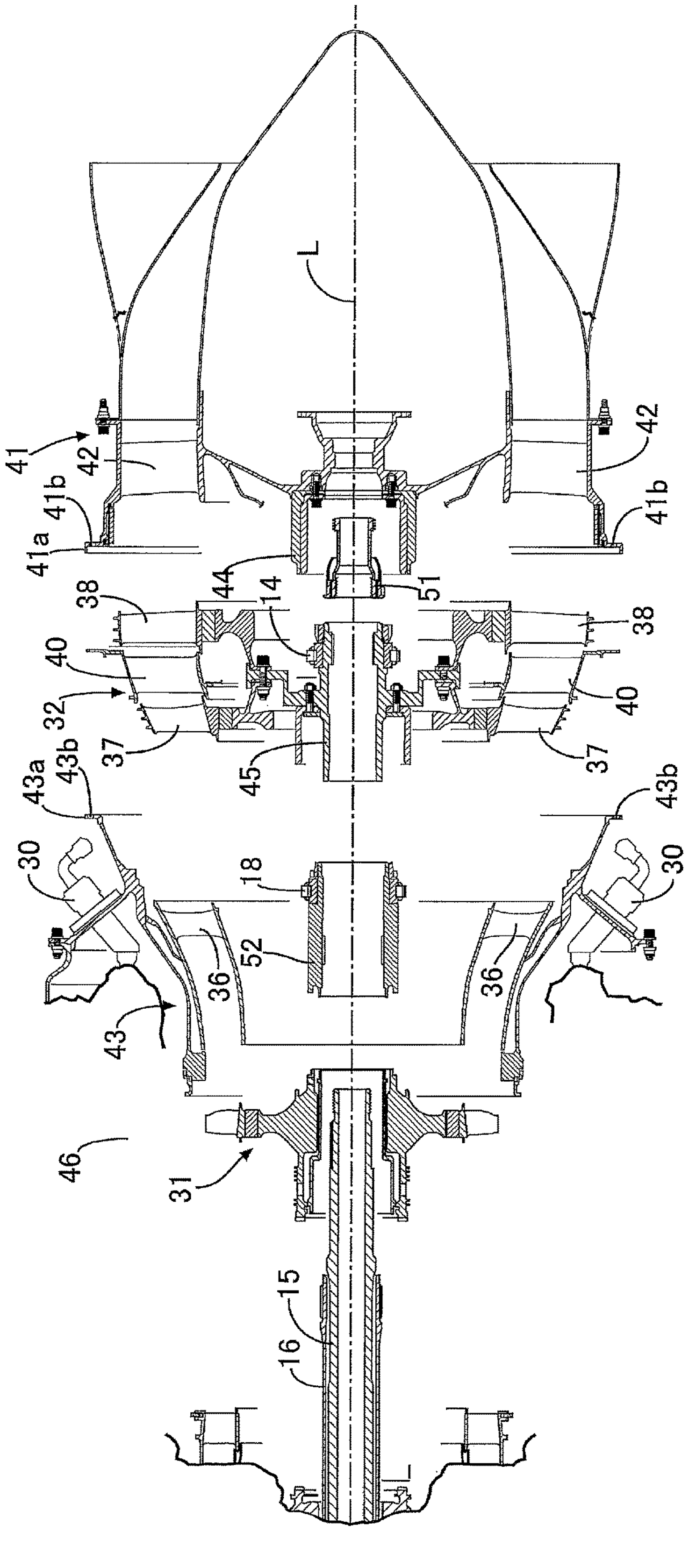

As shown in FIG. 3, the high-pressure turbine 31, the turbine duct 43, the low-pressure turbine 32 and the exhaust nozzle 41 are arranged in this order from a front to a rear while surrounding peripheries of the low-pressure shaft 15 and the high-pressure shaft 16 located on an axis L of the gas turbine engine. The disassembling is performed by detaching the rearmost exhaust nozzle 41, and subsequently the low-pressure turbine 32, the turbine duct 43 and the high-pressure turbine 31 in this order. The assembling is performed by attaching the frontmost high-pressure turbine 31, and subsequently the turbine duct 43, the low-pressure turbine 32 and the exhaust nozzle 41 in this order.

In this embodiment, the exhaust nozzle 41 includes a sleeve 44 concurrently serving as an outer race of the rear first bearing 14. The low-pressure turbine 32 includes: the turbine blades 37, 38 in the two stages; the stator vanes 40 interposed between the turbine blades 37 and the turbine blades 38; and a sleeve 45 spline-fitted to an outer periphery of the low-pressure shaft 15, and concurrently serving as an outer race of the rear second bearing 18. The turbine duct 43 includes the nozzle guide vanes 36 and the fuel injection nozzles 30. The high-pressure turbine 31 includes a sleeve 46 spline-fitted to an outer periphery of the high-pressure shaft 16.

Next, based on FIGS. 4 to 7, descriptions will be provided for structures of a first guide jig 62 and a first holding tool 63 of an exhaust nozzle attaching and detaching device 61 for attaching and detaching the exhaust nozzle 41.

It should be noted that the outer casing 11 of the gas turbine engine is divided into a central casing 47 and a rear casing 48. The disassembling and assembling work is performed with the rear casing 48 detached from the central casing 47 (see FIG. 2). In addition, since multiple pipes and wires are attached to an outside of the gas turbine engine, the disassembling and assembling work is performed with these pipes and wires detached from the outside thereof in advance.

The first guide jig 62 includes: a guide rod 64 having a linear shape and a circular section; a first clamp plate 65 having a flat plate shape and fixed to a front end of the guide rod 64; a second clamp plate 67 which is disposed in parallel to the first clamp plate 65, and to which two bolts 66 penetrating through the first clamp plate 65 are screwed; a hollow slide block 68 slidably supported on the guide rod 64; and a hook 70 connected to the slide block 68 via a turn buckle 69.

The turn buckle 69 includes: a threaded shaft 71 having opposite ends at which mutually reverse threads are formed; and a lever 72 for rotating the threaded shaft 71. An upper thread of the threaded shaft 71 is screwed to a lower wall of the slide block 68, while a lower thread of the threaded shaft 71 is screwed to an upper wall of the hook 70. Furthermore, the first clamp plate 65 is provided with four fixing pins 73 which are fittable to pin holes 67*a* of the second clamp plate 67.

The first holding tool 63 includes: a first flange 74 having a flat plate shape; a second flange 75 having a flat plate shape, and disposed in parallel to the first flange 74; a bolt 76 penetrating through the first flange 74, and screwed to the second flange 75; a rod 77 having an inverted U-shape with opposite ends fixed to the first flange 74; a lock portion 78 provided to an upper end of the rod 77; and a split pin 79 for restricting an axial position of the bolt 76 relative to the first flange 74. The first flange 74 includes four lock holes 74*a*, while the second flange 75 have four lock pins 80 which project in a direction of separating from the first flange 74.

Figure 4:
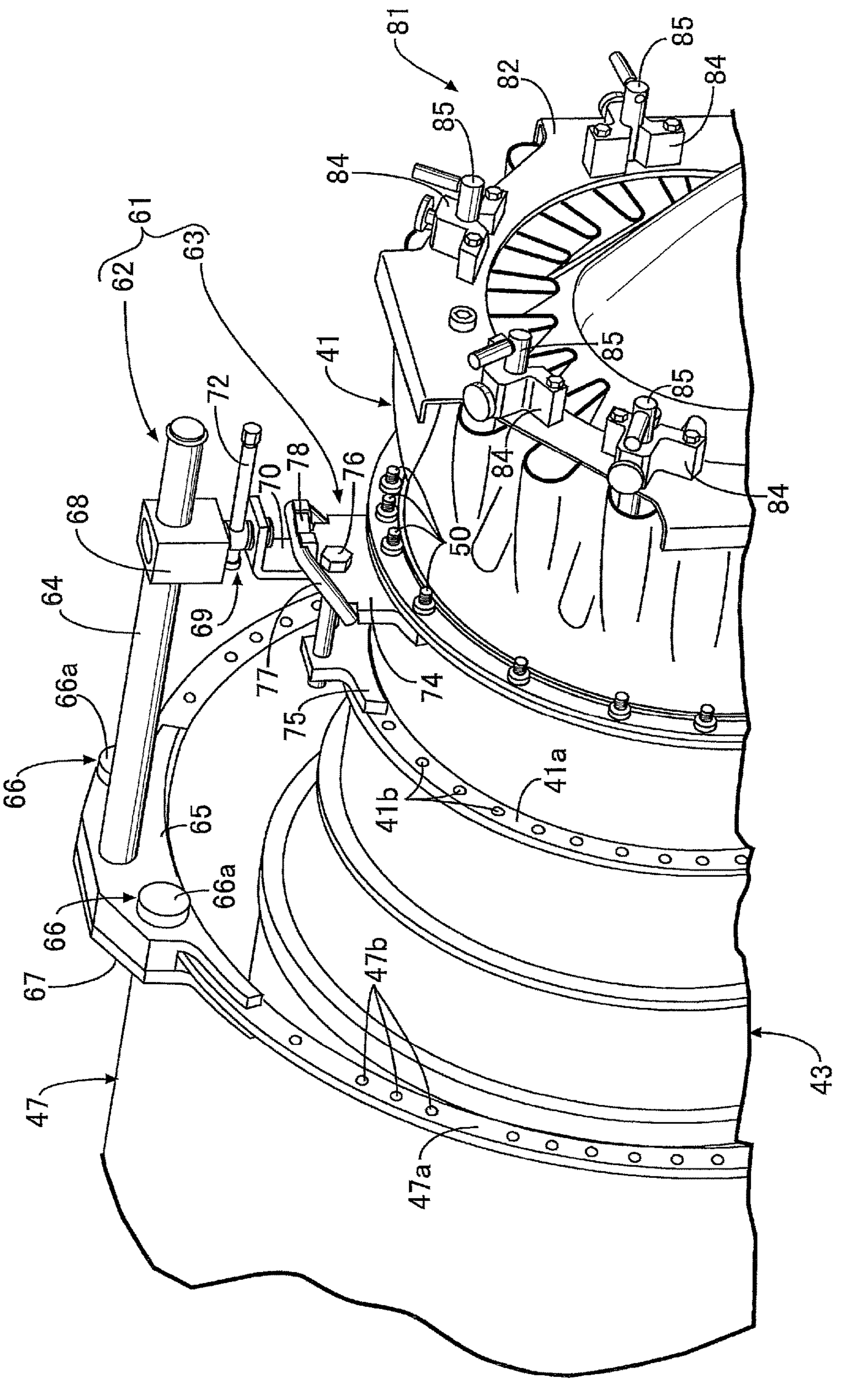
Figure 5:
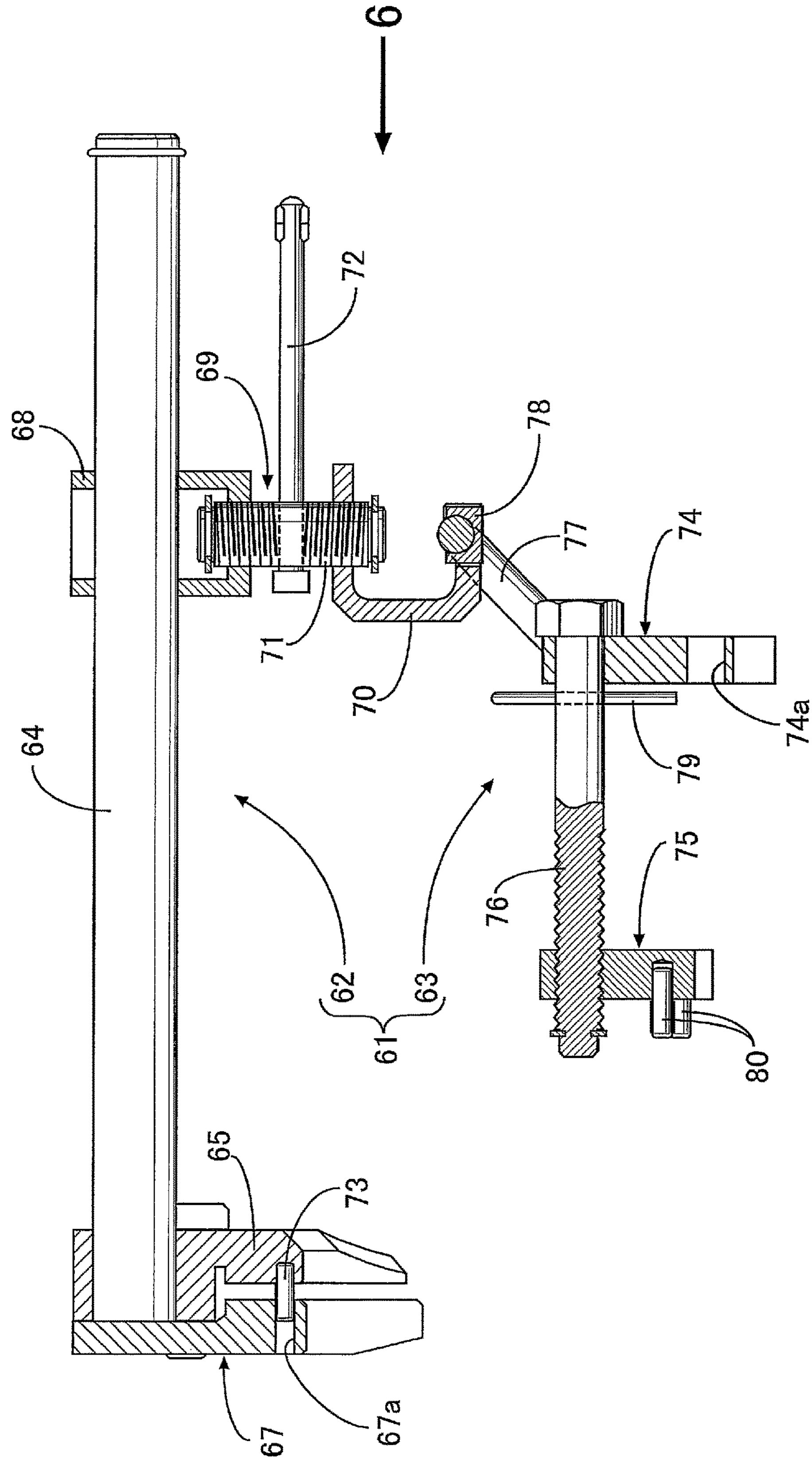
Figure 6:
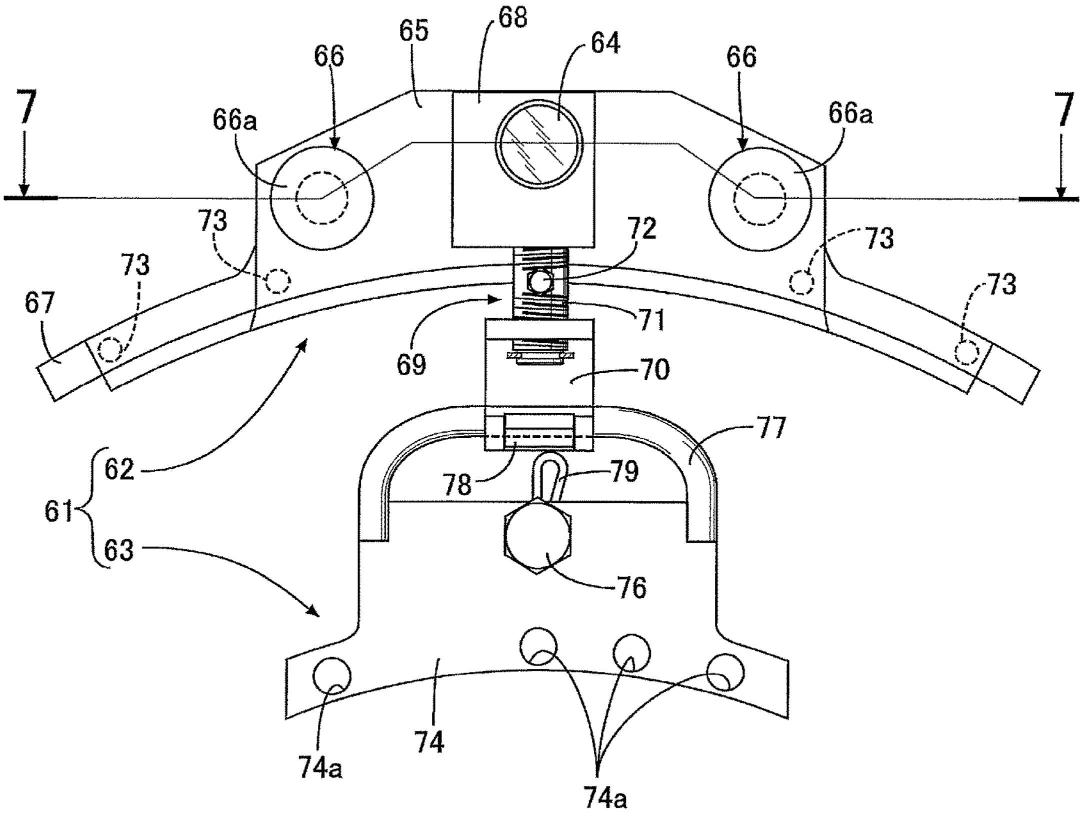
Figure 7:
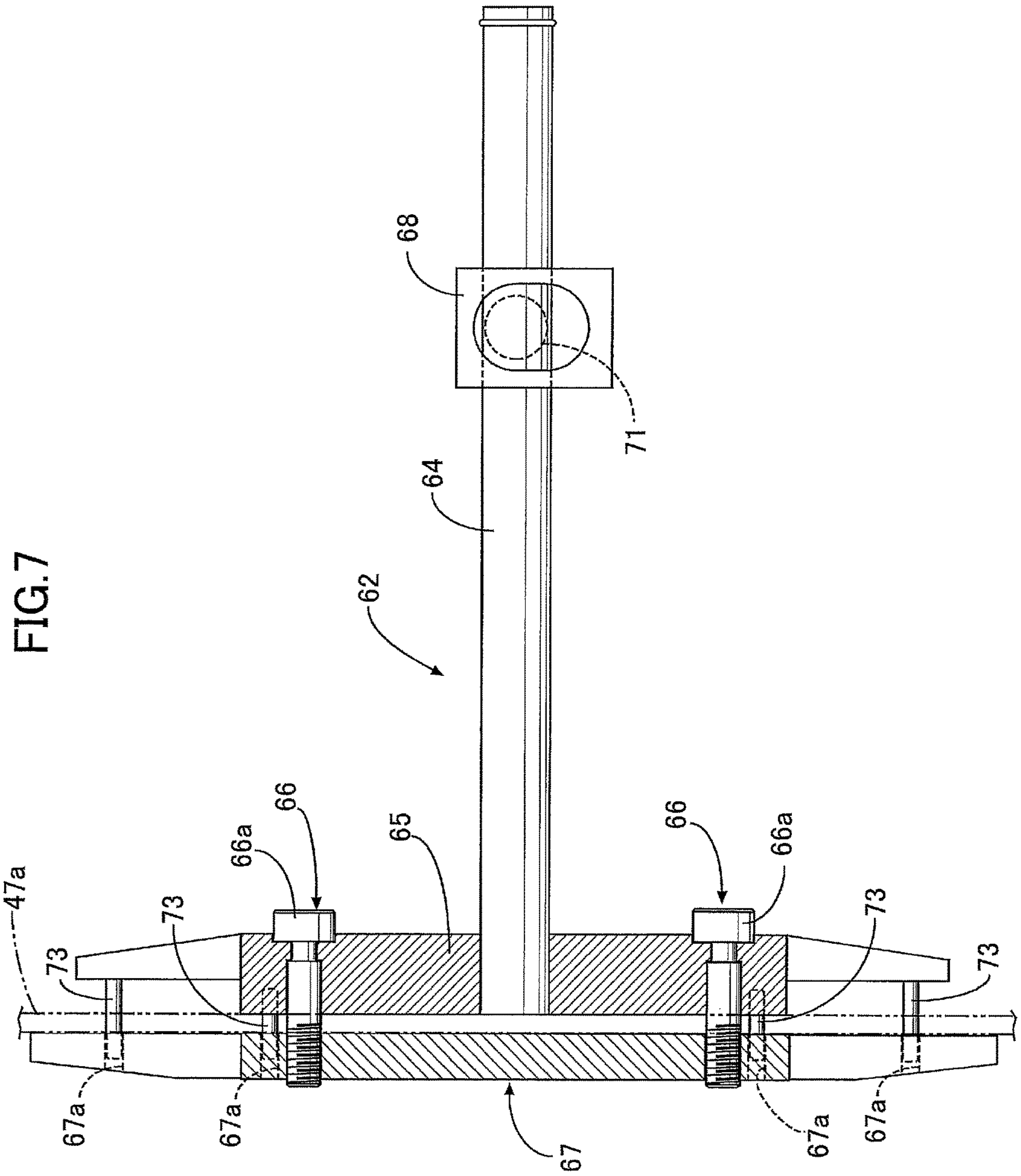
Figure 8:
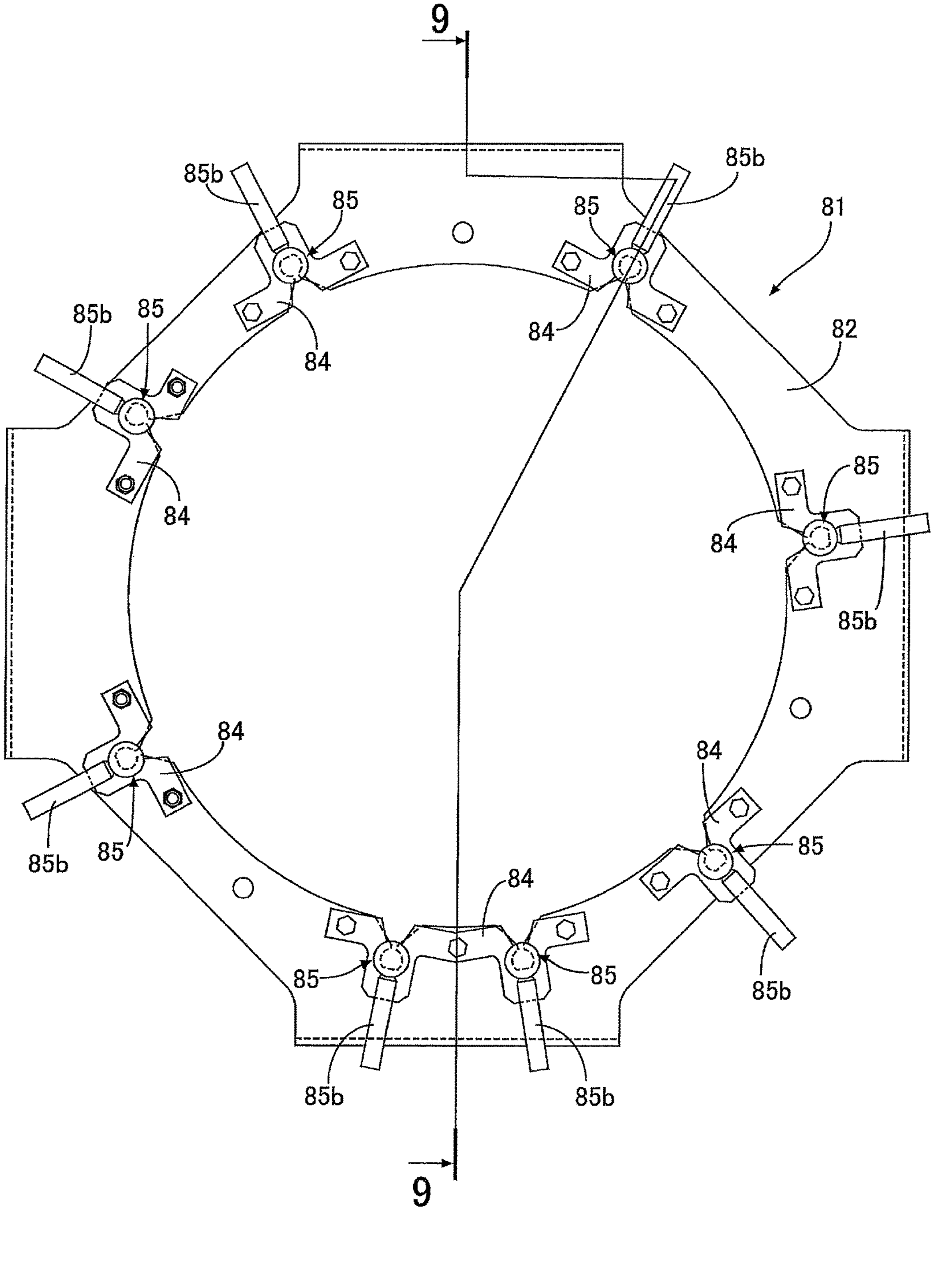
Figure 9:
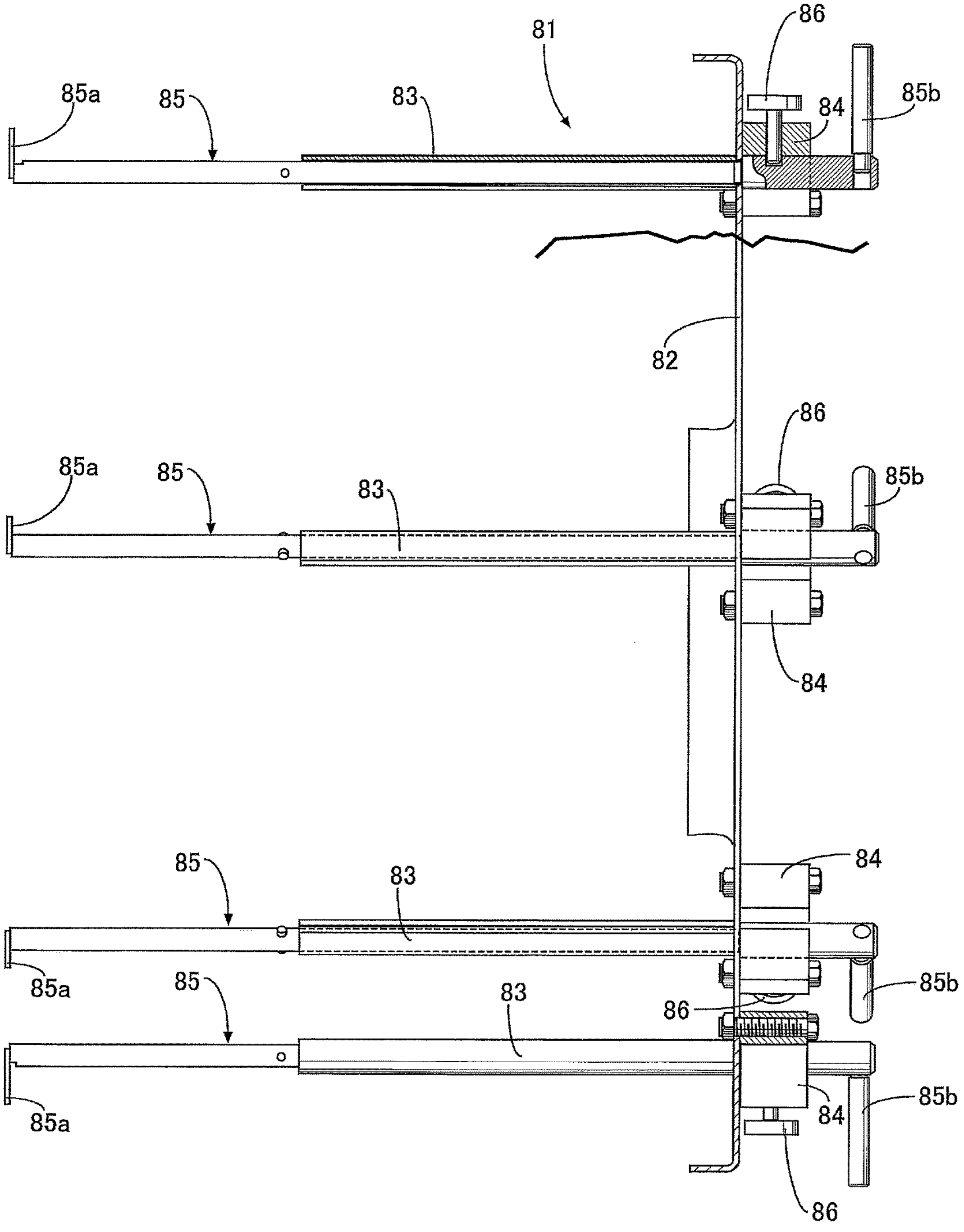

Next, based on FIGS. 4, 8 and 9, descriptions will be provided for a structure of an attachment and detachment auxiliary jig 81 of the exhaust nozzle attaching and detaching device 61 for attaching and detaching the exhaust nozzle 41 to and from the low-pressure turbine 32.

The attachment and detachment auxiliary jig 81 includes: a plate 82 made from an annular plate material; eight guide pipes 83 projecting forward from the plate 82; eight blocks 84 fixed to a rear surface of the plate 82, and provided correspondingly to the respective guide pipes 83; eight lock rods 85 rotatably fitted to the respective guide pipes 83; and eight bolts 86 screwed to the respective blocks 84, and being capable of fixing the lock rods 85. A front end of each lock rod 85 is provided with a hook 85*a* bent at a right angle. In addition, a rear end of each lock rod 85 is provided with a lever 85*b* bent at a right angle.

Figure 12:
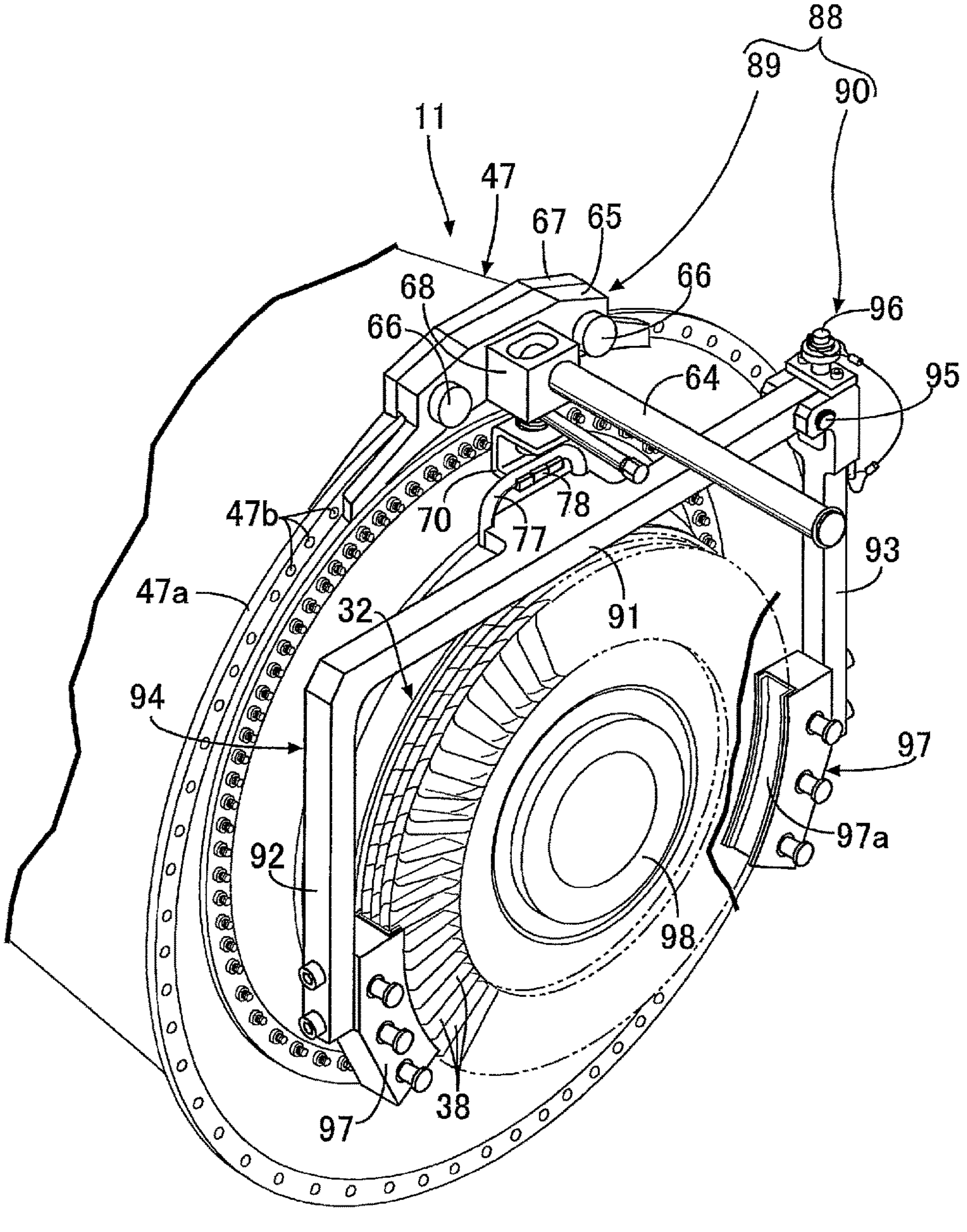
Figure 13:
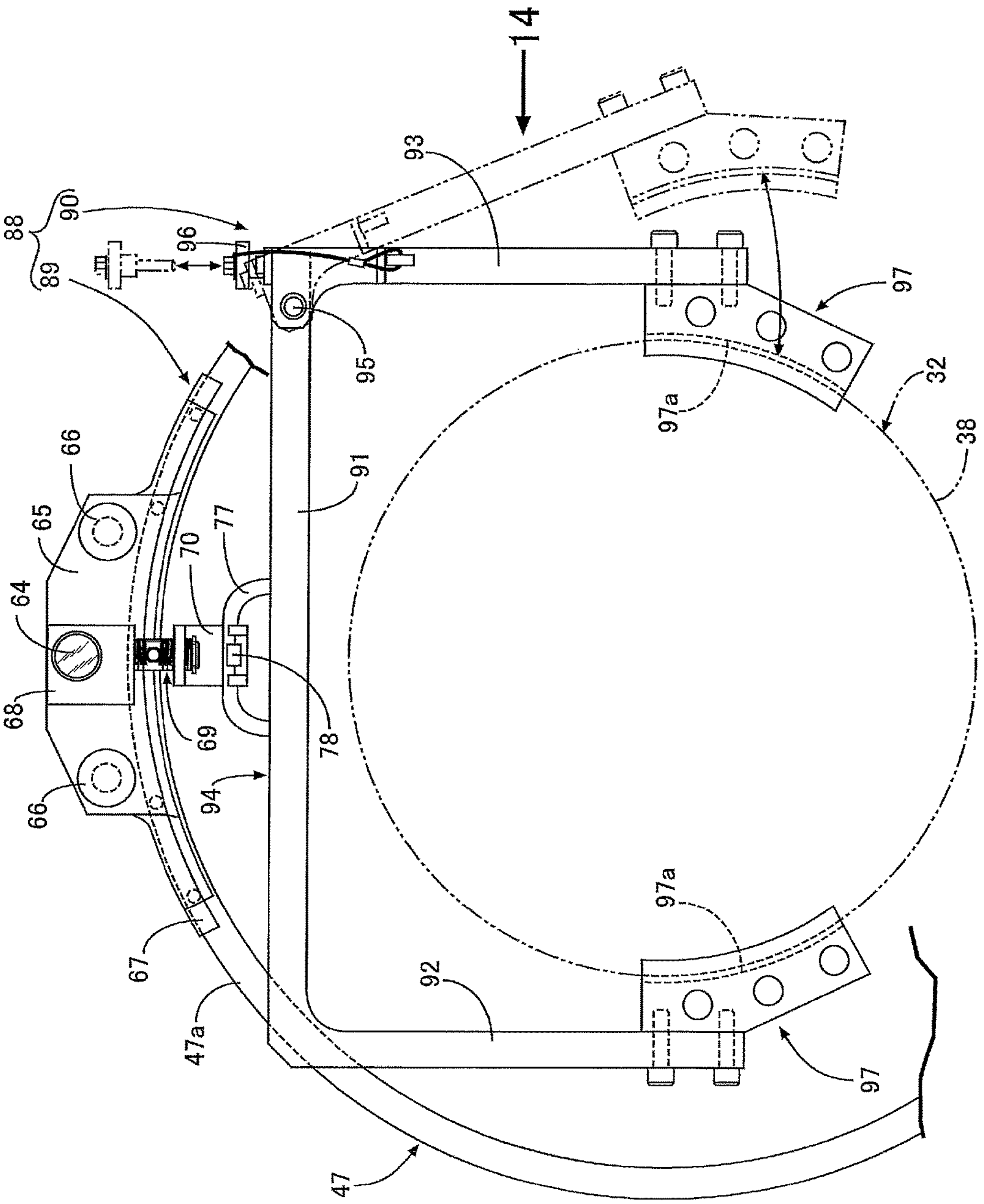
Figure 14:
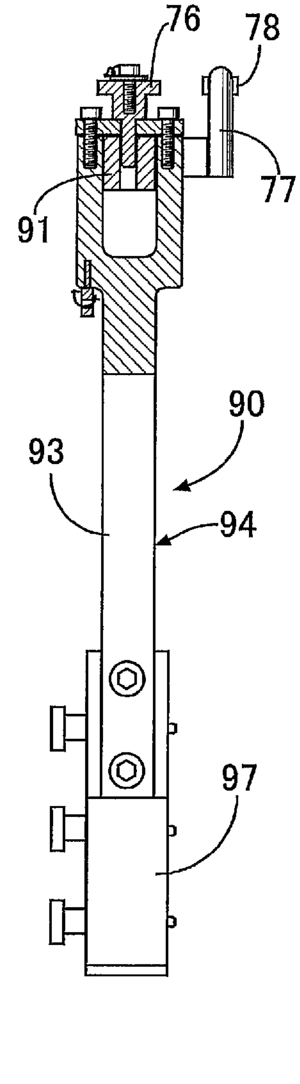

Next, based on FIGS. 12 to 14, descriptions will be provided for structures of a second guide jig 89 and a second holding tool 90 of a low-pressure turbine attaching and detaching device 88 for attaching and detaching the low-pressure turbine 32.

In the embodiment, the structure and operation of the second guide jig 89 are the same as those of the first guide jig 62. For this reason, the first guide jig 62, as it is, may be used as the second guide jig 89.

The second holding tool 90 includes a gate-shaped frame 94 obtained by joining a lateral member 91, a first longitudinal member 92 and a second longitudinal member 93 together in the shape of a gate. The lateral member 91 and the first longitudinal member 92 are formed integrally. On the other hand, the second longitudinal member 93 is swingably supported on the lateral member 91 via a fulcrum pin 95. When a fixing pin 96 is inserted through and connects the second longitudinal member 93 and the lateral member 91, the lateral member 91 and the second longitudinal member 93 are fixed together so as to intersect each other at a right angle. One block 84 is fixed to a central portion of the lateral member 91 via the corresponding guide pipe 83 having an inverted U-shape. This block 84 is engageable with the hook 70 of the second guide jig 89.

Inner peripheries of arc-shaped engagement portions 97 provided respectively to lower ends of the first longitudinal member 92 and the second longitudinal member 93 include support grooves 97*a* for supporting tip end portions of the rear-stage turbine blades 38 of the low-pressure turbine 32, the support grooves 97*a* each having a section with an angular U-shape. Elastic members for protecting the tip end portions of the turbine blades 38 are attached to inner surfaces of the support grooves 97*a*.

Figure 10:
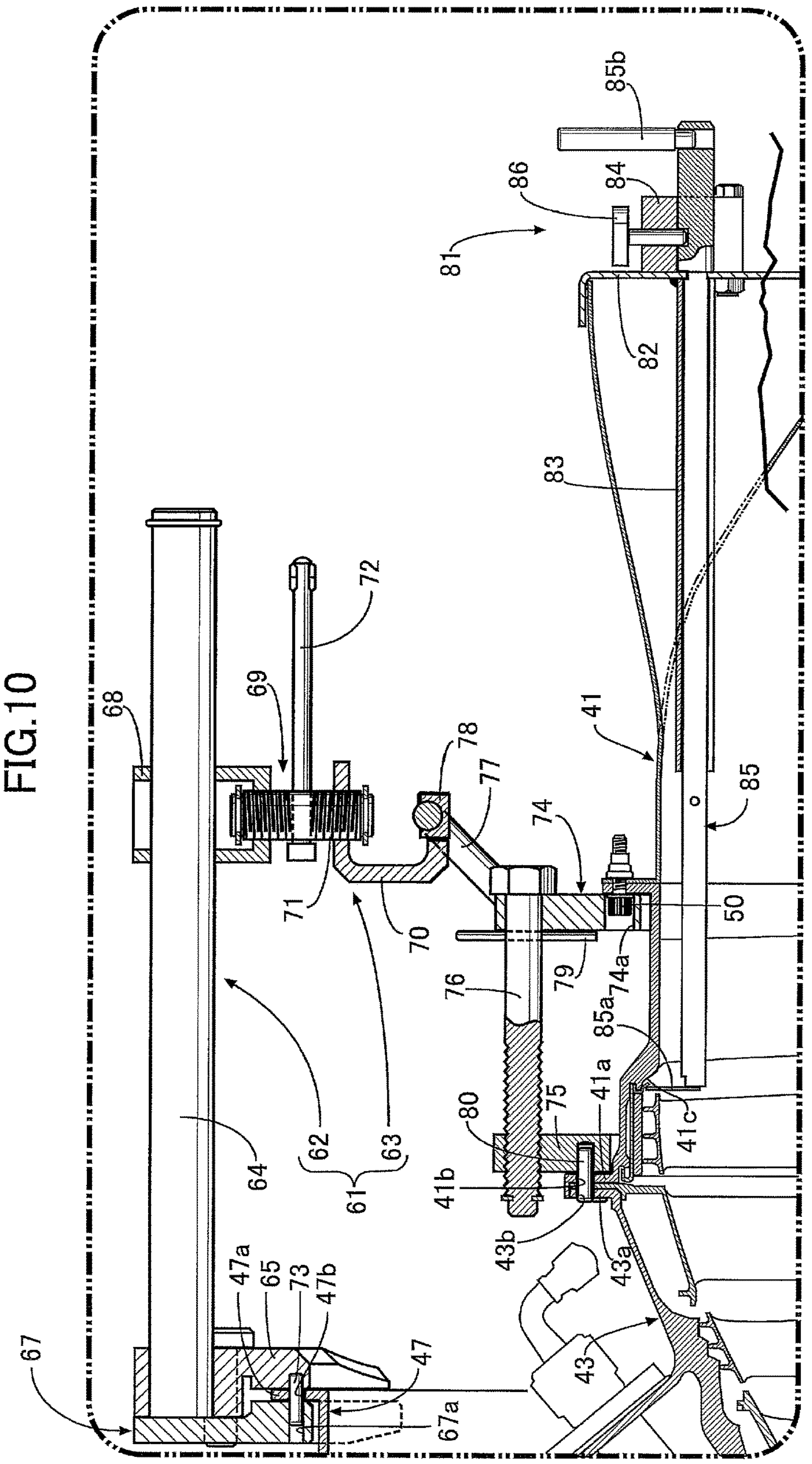
Figure 11:
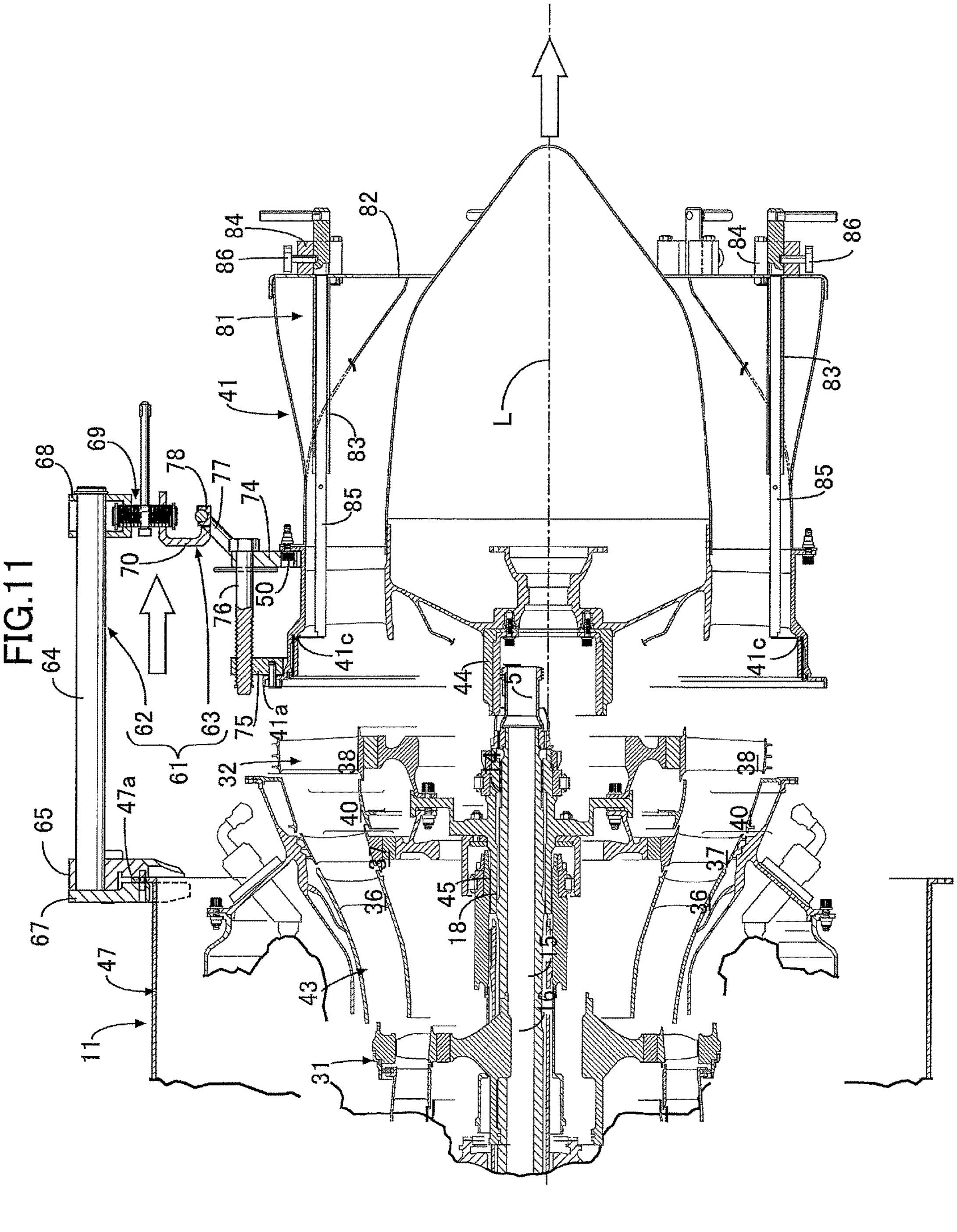

Next, based on FIGS. 4, 10 and 11, descriptions will be provided for an operation for detaching the exhaust nozzle 41.

Before detaching the exhaust nozzle 41, bolts 49 (see FIG. 2) for fastening a flange 41*a* at a front end of the exhaust nozzle 41 to a flange 43*a* at a rear end of the turbine duct 43 are detached. Subsequently, the second clamp plate 67 is brought close to the first clamp plate 65 by rotating head portions 66*a* of the bolts 66 of the first guide jig 62, and the fixing pins 73 provided to the first clamp plate 65 are fitted to bolt holes 47*b* of a flange 47*a* of the central casing 47 and pin holes 67*a* of the second clamp plate 67. In this state, the head portions 66*a* are manipulated so that the bolts 66 are rotated. Thereby, the second clamp plate 67 is brought closer to the first clamp plate 65. Thus, the flange 47*a* of the central casing 47 is clamped between the first clamp plate 65 and the second clamp plate 67. By this, the first guide jig 62 is firmly fixed to the central casing 47. At this time, since a front surface of the first clamp plate 65 is abutted against a rear surface of the flange 47*a* which is a machined surface of the central casing 47, the first guide jig 62 can be attached with high positional precision without requiring a specialized positioning jig.

Next, when in the first holding tool 63, the second flange 75 has been brought close to the first flange 74 by rotating the bolt 76, the lock portion 78 at the upper end of the rod 77 of the first holding tool 63 is locked to the hook 70 of the first guide jig 62. In this state, the bolt 76 is rotated. Thereby, the second flange 75 is separated forward from the first flange 74. Thus, the lock holes 74*a* of the first flange 74 are fitted to head portions of bolts 50 provided to an intermediate portion of the exhaust nozzle 41, and the lock pins 80 provided to the second flange 75 are fitted to bolt holes 41*b* of the flange 41*a* of the exhaust nozzle 41, and bolt holes 43*b* of the flange 43*a* of the turbine duct 43. By this, the first holding tool 63 is firmly fixed to the exhaust nozzle 41.

At this time, an up-down position of the hook 70 relative to the slide block 68 is finely adjusted by rotating the threaded shaft 71 of the turn buckle 69 of the first guide jig 62 with the lever 72. Thereby, it is possible to increase precision of attaching the first guide jig 62 and the first holding tool 63.

Subsequently, the attachment and detachment auxiliary jig 81 is attached to the exhaust nozzle 41. To put it concretely, from the rear, the lock rods 85 are inserted into the inside of exhaust nozzle 41 with the bolts 86 of the attachment and detachment auxiliary jig 81 loosened. By manipulating levers 85*b*, the lock rods 85 are rotated relative to the guide pipes 83. Thereby, the hooks 85*a* of the lock rods 85 are locked to a step portion 41*c* at a front end of the exhaust nozzle 41. Thereafter, the lock rods 85 are unrotatably fixed to the blocks 84 by fastening the bolts 86. As a result, a rear end of the exhaust nozzle 41 is pressed against a front surface of the plate 82, and the attachment and detachment auxiliary jig 81 is fixed to the exhaust nozzle 41.

In this way, when an operator pulls the exhaust nozzle 41 itself or the attachment and detachment auxiliary jig 81 rearward by hand in a state where the first guide jig 62, the first holding tool 63 and the attachment and detachment auxiliary jig 81 are attached, the slide block 68 of the first guide jig 62 moves rearward while guided by the guide rod 64. Thereby, the exhaust nozzle 41 is detached from the turbine duct 43.

The sleeve 44 integral with the exhaust nozzle 41 concurrently serves as the outer race of the rear first bearing 14 provided on the low-pressure turbine 32 side (see FIG. 3). For this reason, in a case where the exhaust nozzle 41 even slightly tilts when the exhaust nozzle 41 is pulled out rearward and detached, the rear first bearing 14 may be damaged. Because of its heavy weight, the exhaust nozzle 41 is difficult to pull out rearward straightly along the axis L without using a jig.

In contrast, in the embodiment, in a state where the first guide jig 62 and the first holding tool 63 of the exhaust nozzle attaching and detaching device 61 are attached, when the exhaust nozzle 41 is pulled rearward, the slide block 68 slides along the guide rod 64 of the first guide jig 62. This makes it possible to pull out the exhaust nozzle 41 rearward straightly along the axis L with the weight of the exhaust nozzle 41 supported by the outer casing 11 via the first guide jig 62. Accordingly, the exhaust nozzle 41 can be easily detached without damaging the rear first bearing 14 or the exhaust nozzle 41.

As described above, the exhaust nozzle attaching and detaching device 61 and the attachment and detachment auxiliary jig 81 of the embodiment makes it possible to easily detach the exhaust nozzle 41 while leaving the gas turbine engine installed in an airframe in a horizontal attitude, and to achieve reduction in maintenance cost.

Figure 15:
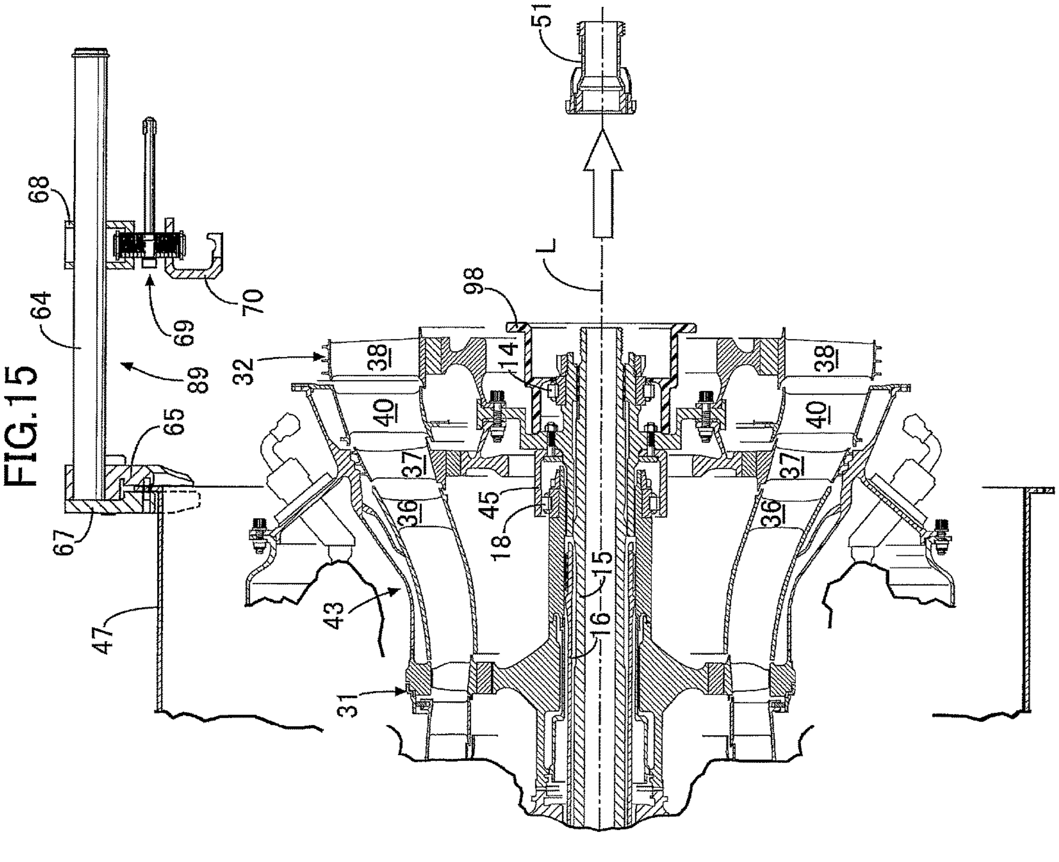
Figure 16:
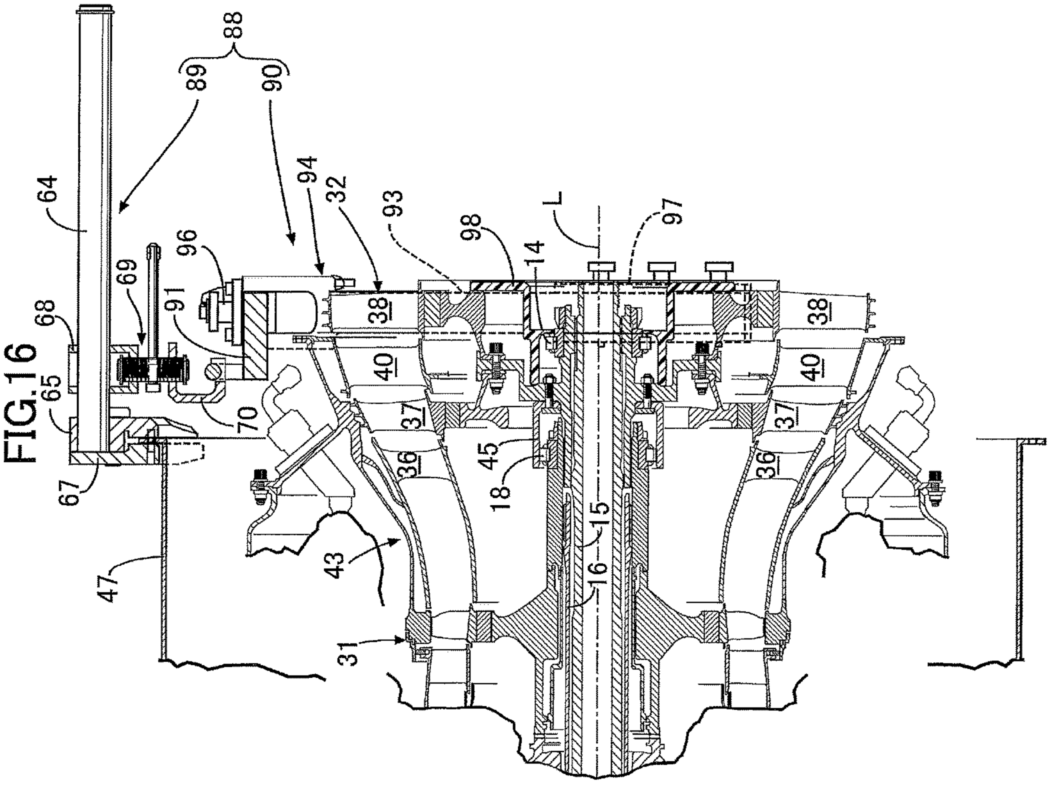
Figure 17:
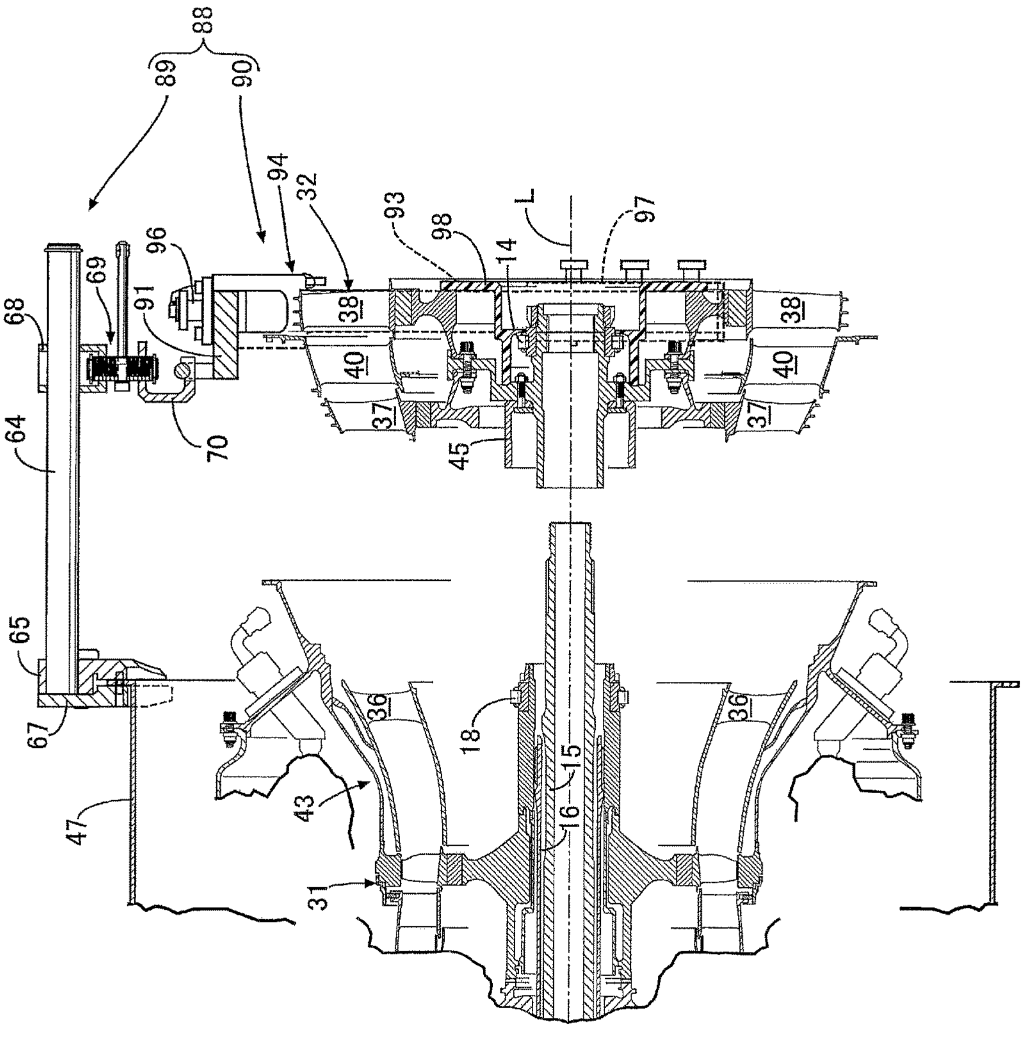

Next, based on FIGS. 15 to 17, descriptions will be provided for an operation for detaching the low-pressure turbine 32.

As shown in FIG. 15, a rear end of the low-pressure turbine 32 is locked by a nut member 51 which is screwed to the rear end of the low-pressure shaft 15. For this reason, the nut member 51 is detached from the low-pressure shaft 15 before starting the work of detaching the low-pressure turbine 32. At this time, a cylindrical stepped protection cap 98 is attached so as to cover an outer periphery of the rear first bearing 14 because the rear first bearing 14 is exposed with no outer race and may be damaged when the nut member 51 is detached.

Like when the exhaust nozzle 41 is detached, the second guide jig 89 (which is a part identical to the first guide jig 62, in the embodiment) is fixed to the flange 47*a* of the central casing 47. Meanwhile, as shown in FIG. 16, instead of the lock portion 78 of the first holding tool 63, the lock portion 78 of the second holding tool 90 is locked to the hook 70 of the second guide jig 89. The second longitudinal member 93 of the gate-shaped frame 94 of the second holding tool 90 is opened by being swung around the fulcrum pin 95 in advance. Thereafter, the second longitudinal member 93 is closed from this state, and is fixed to the lateral member 91 with the fixing pin 96. Thereby, the tip end portions of the rear-stage turbine blades 38 of the low-pressure turbine 32 are fitted to the support grooves 97*a* of the pair of engagement portions 97, and the low-pressure turbine 32 is thus held by the second holding tool 90 (see FIG. 13).

From this state, as shown in FIG. 17, when the sleeve 45 at the center of the low-pressure turbine 32 is pulled in the direction of the axis L using a hydraulic jig not illustrated, the slide block 68 slides along the guide rod 64 of the second guide jig 89. This makes it possible to pull out the low-pressure turbine 32 rearward straightly along the axis L with the weight of the low-pressure turbine 32 supported by the outer casing 11 via the second guide jig 89. Accordingly, the low-pressure turbine 32 can be easily detached without damaging the turbine blades 37, 38 or the stator vanes 40.

Furthermore, although the low-pressure turbine 32 integrally includes the sleeve 45 which concurrently serves as the outer race of the rear second bearing 18, the straight rearward pulling-out of the low-pressure turbine 32 prevents the outer race from being twisted with respect to an inner race and rollers of the rear second bearing 18 which remain on the high-pressure shaft 16 side. Accordingly, the rear second bearing 18 is prevented from being damaged. In addition, since the second holding tool 90 includes the arc-shaped engagement portions 97 which are engaged with the tip end portions of the turbine blades 38 of the low-pressure turbine 32, the low-pressure turbine 32 can be held by the second holding tool 90 in a stable attitude. Incidentally, when the low-pressure turbine 32 is pulled out, the protection cap 98 is pulled out integrally with the low-pressure turbine 32.

Like the work of detaching the exhaust nozzle 41, the work of detaching the low-pressure turbine 32 can be performed while leaving the gas turbine engine installed in the airframe in the horizontal attitude. For this reason, reduction in maintenance cost can be achieved.

When the detachment of the low-pressure turbine 32 in the above manner is completed, the turbine duct 43 located in front of the low-pressure turbine 32 becomes detachable. Thus, the turbine duct 43 is detached by being pulled rearward.

Subsequently, a parts group 52 (see FIG. 3) including the rear second bearing 18, multiple nut members and the like, fixed on the high-pressure shaft 16 and the low-pressure shaft 15 in the rear of the high-pressure turbine 31 is removed as a preparation for the detachment of the high-pressure turbine 31. Thereafter, the high-pressure turbine 31 is pulled out rearward using a hydraulic jig not illustrated. Thus, the work of detaching the main components in the hot section of the rear half of the gas turbine engine is completed.

The foregoing descriptions have been provided for the work of disassembling in the hot section of the gas turbine engine. The assembling work can be performed with a sequence reverse to that for the disassembling work by use of the exhaust nozzle attaching and detaching device 61, the attachment and detachment auxiliary jig 81 and the low-pressure turbine attaching and detaching device 88 of the embodiment.

An embodiment of the present invention is explained above, but the present invention is not limited to the above-mentioned embodiment and may be modified in a variety of ways as long as the modifications do not depart from the gist of the present invention.

For example, although in the embodiment, the first guide jig 62 for attaching and detaching the exhaust nozzle 41, and the second guide jig 89 for attaching and detaching the low-pressure turbine 32 are formed from and share the same component, the first guide jig 62 and the second guide jig 89 may be formed from different components, respectively.

What is claimed is:

1. A support apparatus for disassembling and assembling a gas turbine engine, the gas turbine engine housing a low-pressure shaft, a low-pressure turbine and an exhaust nozzle inside a cylindrical casing surrounding an axis of the gas turbine engine, the low-pressure shaft being disposed on the axis, the low-pressure turbine being fixed to an outer periphery of the low-pressure shaft, and the exhaust nozzle being disposed in a rear of the low-pressure turbine, the support apparatus comprising:

an exhaust nozzle attaching and detaching device configured to guide movement of the exhaust nozzle in a direction of the axis and including a first guide jig which is configured to be detachably fixed to the casing, and a first holding tool which is configured to detachably support the exhaust nozzle and is engaged with the first guide jig; and a low-pressure turbine attaching and detaching device configured to guide movement of the low-pressure turbine in the direction of the axis and including a second guide jig which is configured to be detachably fixed to the casing, and a second holding tool which is configured to detachably support the low-pressure turbine and is engaged with the second guide jig.

2. The support apparatus for disassembling and assembling a gas turbine engine according to claim 1, wherein the first guide jig and the second guide jig are configured to be fixed with a machined surface of the casing used as a reference surface.

3. The support apparatus for disassembling and assembling a gas turbine engine according to claim 1, wherein the second holding tool includes an arc-shaped engagement portion which is configured to be engaged with blade ends of a plurality of rotor blades of the low-pressure turbine, the rotor blades being provided adjacent to one another in a peripheral direction of the low-pressure turbine.

4. The support apparatus for disassembling and assembling a gas turbine engine according to claim 1, further comprising a protection tool which is configured to be detachably attached to the low-pressure turbine so as to cover a part of the low-pressure turbine which is to be exposed in a state where the exhaust nozzle is detached.

5. The support apparatus for disassembling and assembling a gas turbine engine according to claim 2, wherein the second holding tool includes an arc-shaped engagement portion which is configured to be engaged with blade ends of a plurality of rotor blades of the low-pressure turbine, the rotor blades being provided adjacent to one another in a peripheral direction of the low-pressure turbine.

6. The support apparatus for disassembling and assembling a gas turbine engine according to claim 2, further comprising a protection tool which is configured to be detachably attached to the low-pressure turbine so as to cover a part of the low-pressure turbine which is to be exposed in a state where the exhaust nozzle is detached.

7. The support apparatus for disassembling and assembling a gas turbine engine according to claim 3, further comprising a protection tool which is configured to be detachably attached to the low-pressure turbine so as to cover a part of the low-pressure turbine which is to be exposed in a state where the exhaust nozzle is detached.

* * * * *